Nov. 21, 1939.  E. H. NIEMAN  2,180,765
CARBURETOR DEVICE
Filed March 17, 1936  3 Sheets-Sheet 1

INVENTOR.
Ernst H. Nieman.
BY
ATTORNEY.

Nov. 21, 1939.  E. H. NIEMAN  2,180,765

CARBURETOR DEVICE

Filed March 17, 1936  3 Sheets-Sheet 2

INVENTOR.
Ernst H. Nieman.

BY Donald U. Rich

ATTORNEY.

Nov. 21, 1939.  E. H. NIEMAN  2,180,765
CARBURETOR DEVICE
Filed March 17, 1936  3 Sheets-Sheet 3

INVENTOR.
Ernst H. Nieman.
BY
ATTORNEY.

Patented Nov. 21, 1939

2,180,765

UNITED STATES PATENT OFFICE

2,180,765

CARBURETOR DEVICE

Ernst H. Nieman, Pine Lawn, Mo., assignor to Carter Carburetor Corporation, St. Louis, Mo., a corporation of Delaware Application March 17, 1936, Serial No. 69,279

10 Claims. (Cl. 261—1)

This invention relates to carburetors for internal combustion engines and consists particularly in novel means for resisting transference of heat from the engine to the body and fuel bowl of the carburetor and thereby decreasing undesirable percolation.

Downdraft carburetors, now generally used with modern automobile engines, are ordinarily located above and directly in the path of heat rising from the engine manifolds, which are heated to a high temperature during operation of the engine. The heat thus transmitted to the gasoline fuel bowl and fuel passages and that passing through the manifold connection is frequently sufficient to cause the gasoline to expand excessively and boil or percolate, forcing quantities of liquid fuel to spill through the fuel nozzles into the mixing chamber and collect in puddles in the intake manifold. This result is most likely to occur immediately after the engine is stopped, at which time the engine heat rises rapidly, due to elimination of the cooling effect of the fan and water pump, and "loading" may result which causes excessive carbon deposits and decreased power when the engine is started again. Also, restarting of the engine may be rendered difficult for a substantial period after it has been stopped, and there are other disadvantageous or injurious results.

Percolation can be eliminated if the fuel nozzle is located at a sufficient height above the normal fuel level in the carburetor. This height, through which the fuel must be lifted by suction, can be decreased, with consequent increase in the efficiency of the carburetor and without the danger of percolation, if means is provided for holding down the temperature of the carburetor.

One object of the present invention is to provide means for decreasing percolation in internal combustion engine carburetors.

Another object is to provide means for resisting transference of heat between the engine manifold and the carburetor body.

Another object is to improve percolation conditions in carburetors without varying the fuel nozzle characteristics.

Another object is to provide a heat resisting spacer device for insertion between the intake manifold of an internal combustion engine and the body portion of the carburetor, which device is light, rugged, and inexpensive to manufacture.

Still another object is to provide a spacer device of the above type arranged for accommodating various passages and securing means connecting with the carburetor.

The above objects and others hereinafter appearing are obtained substantially by the present invention which involves the insertion between the intake manifold and the carburetor main body portion of a heat resisting spacer device of skeletal construction, conveniently formed as a die casting and having lugs and apertured bosses for directly engaging the associated structure, for reinforcement, and for accommodating passages and attaching means extending between the manifold and carburetor.

In the accompanying drawings which illustrate the invention,

Figure 1 illustrates a carburetor comprising a main body portion, generally indicated at A, and a lower flanged portion B carried above the engine C, and directly connecting with the intake manifold D. The lower portion B of the carburetor is secured to the riser portion 1 of the intake manifold, and separated from the main body portion A by means of the spacer device generally indicated at E.

Figures 1, 2:
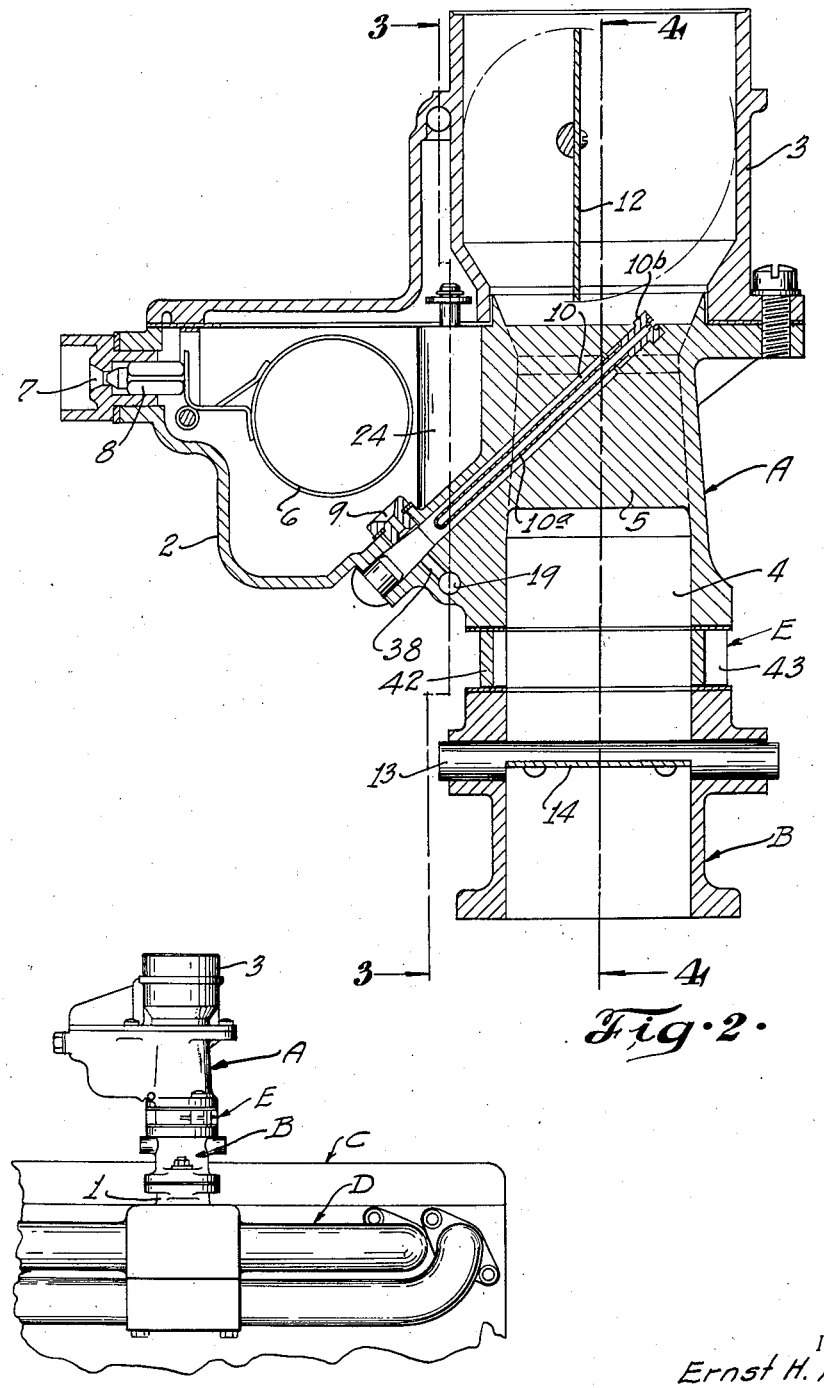
Figure 1 is a side view showing a carburetor and portion of an internal combustion engine with the invention applied thereto.
Figure 2 is a sectional view of the carburetor alone, taken substantially on the line 2—2 of Figure 4.

The carburetor main body portion includes a fuel bowl portion 2, an air inlet horn portion 3, a fuel mixture conduit 4, and a rib or jet bar 5. Located within the bowl 2 is a needle valve 8 and float 6 controlling the fuel inlet 7, connected with the main gasoline tank by any suitable means (not shown). The fuel bowl communicates with the atmosphere through vent 2a. Fuel is conducted to the mixture chamber through a calibrated jet 9 located near the bottom of the fuel bowl, a passage 10 extending through the jet bar 5 and enclosing a perforated tube 10a, and nozzle openings 11 located a short distance above the fuel level in the bowl, usually about ⅛ of an inch. Tube 10a communicates with the interior of the carburetor through a member 10b having a restricted aperture. Pivoted in the air horn portion 3 is choke valve 12 shown as of the unbalanced butterfly type.

Mounted in the separately formed lower member B of the carburetor is a shaft 13 and a throttle valve 14 having means (not shown) for manual control. Idling passage 15 communicates with the fuel bowl through passages 17, 18 and 19, passage 18 having a calibrated orifice 20. Passage 15 communicates with idle port 16 adjacent the edge of the throttle through corresponding passage 21 in the spacer device and passage 22 in the casting B. A screw 23 provides, in a well-known manner, for manually varying the quantity of air admitted to the idle port.

The portion 18 of the idling passage within the fuel bowl extends through a cylinder 24 conveniently formed as a part of the main body casting, and adjacent this cylinder is a second cylinder 25 forming part of step-up mechanism which, in itself, does not constitute the present invention. The interior of cylinder 25 communicates with the suction in the carburetor posterior to the throttle by means of passage 26 in the main body portion and passages 27 and 28 in the spacer device and casting B, respectively. Slidable in the enlarged upper portion of cylinder 25 is a piston 29 constantly urged toward its uppermost position, as shown, by a coiled spring 30, and having a vertical projection 31 which carries a horizontal bar 32. The end of bar 32 opposite projection 31 slides upon the vertical guide 33, having a threaded portion 34 screwed into the top of the idling passage cylinder 24, and forming a plug therefor. Bar 32, substantially at its center, carries a pin 35 having a tapered point which cooperates with a restricted orifice 36, formed in the hollowed member 37, secured between cylinders 24 and 25, to vary the quantity of fuel supplied to the passage 19 which communicates with the main fuel passage 10 through the auxiliary conduit 38. Pin 35 is slidable in bar 32, but the head portion 35a thereof is normally maintained in engagement with the bar by a coiled spring 39 seated at its lower extremity against the collar 40 on the pin.

Spring 30 is of such strength as to hold the piston 29, bar 32, and pin 35 in their uppermost positions, with bar 32 against a key stop 41 on guide 33, when there is no suction, or relatively little suction, in the mixture conduit posterior to the throttle. Such conditions prevail when the engine is not running or is being cranked, and also in case the throttle is rapidly opened while the engine is operating slowly, so as to supply additional fuel. As soon as the engine fires after cranking and whenever there is substantial suction posterior to the throttle, the piston 29 will be drawn downwardly against spring 30, causing economizer pin 35 to shut off the auxiliary fuel supply. The general features of the carburetor above described, including the economizer arrangement, are at present well-known in the art and do not, in themselves, constitute present invention.

Figure 5:
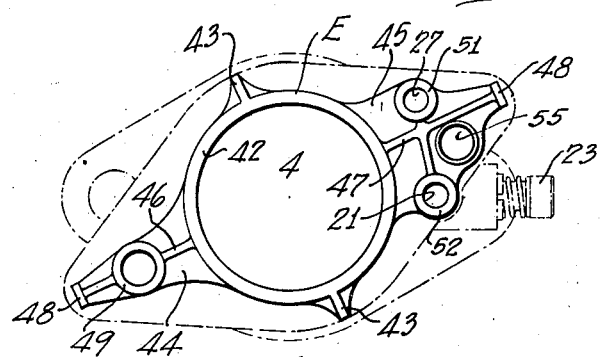
Figure 5 is a plan view of the spacer device, an adjacent part of the carburetor being shown in broken lines.

The spacer device shown in detail in Figure 5 is of generally collar-like construction, conveniently die-cast, and includes a circular body portion 42 having a hollowed interior adapted to form a portion of the carburetor mixing conduit and reinforced by ribs 43, the members 42 and 43 being formed of metal relatively thin horizontally. Projecting from body portion 42 are thin horizontal webs 44 and 45 reinforced at their center portions by vertical ribs 46 and 47 and, at their outer edges, by lugs 48. Formed on the projecting web 44 is an apertured boss 49 constituting additional reinforcement for this web and also functioning to receive a bolt or cap screw as at 50 for securing together the two parts A and B of the carburetor and the spacer device.

Formed on the opposite projecting web 45 are a pair of apertured bosses 51 and 52, the hollowed interiors of which constitute, respectively, the suction passage 27 and the idling passage 21 communicating with corresponding passages in the portions A and B of the carburetor. Web 45 is adequately braced by bosses 51 and 52, ribs 47, and lug 48, and, accordingly, no additional reinforcement is needed around the aperture 55 provided for receiving the attached bolt or cap screw 56.

Figure 6:
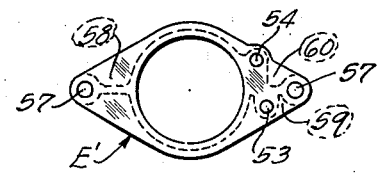
Figure 6 is a plan view of a modified form of spacer device.
Figure 7:
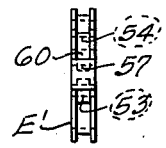
Figure 7 is an end view of the device in Figure 6.

In Figures 6 and 7, the spacer device E' has apertures 53 and 54 forming portions of the idling and suction passages respectively, as in the previous form, and apertures 57 are provided for accommodating attached bolts or screws. The spacer device is deeply pocketed in its edges, as at 58, 59 and 60, whereby, substantial air pockets are provided within the general contour of the device.

Figure 3:
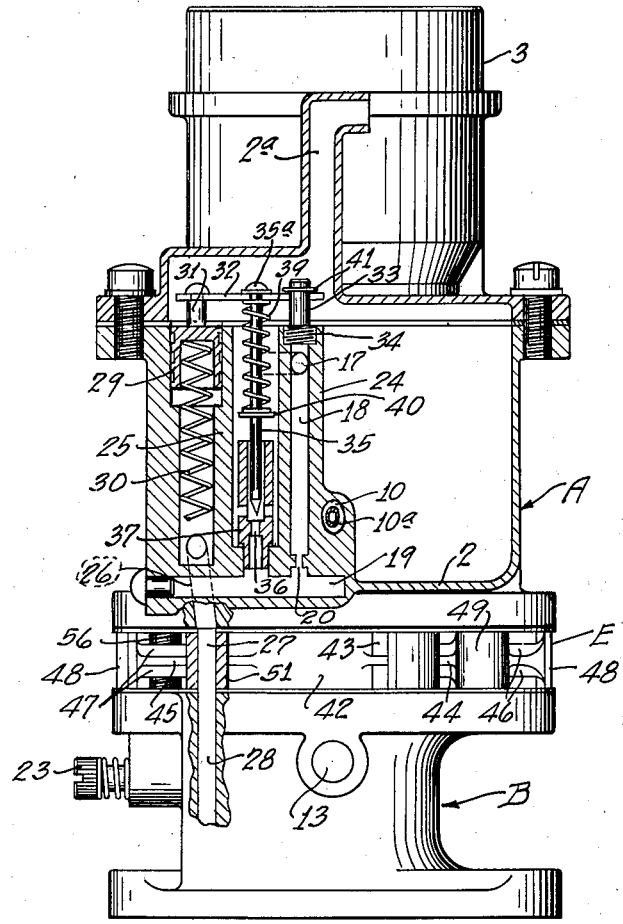
Figure 3 is a section at 90° to Figure 2, and is taken on the line 3—3 of Figure 2.
Figure 4:
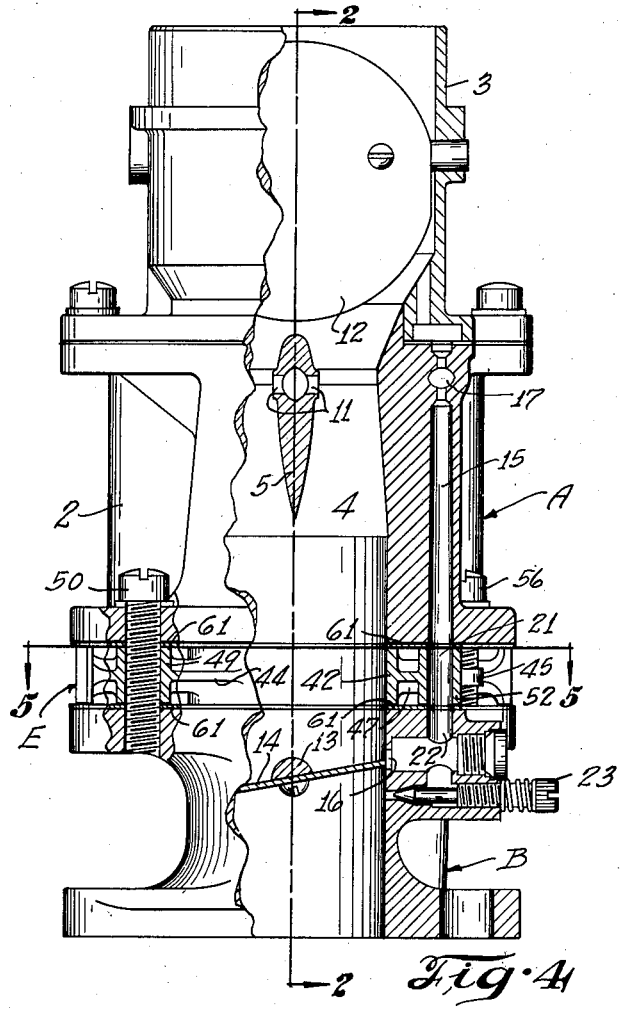
Figure 4 is a view of the carburetor taken from the right hand side of Figure 1, portions being broken away and shown in section substantially on line 4—4 of Figure 2 to illustrate the underlying structure.

If desired, thin gaskets of suitable heat insulating material, preferably non-metallic, may be interposed between the spacer device and the associated carburetor parts, as at 61, Figures 2, 3 and 4, but these are not essential. While the spacer device may be advantageously formed as a die-casting, it may be formed in any other suitable manner, as will occur to a mechanic, and materials other than die-cast metal, such, for instance, as Bakelite, may be used. In some cases, it may be desirable to form spacer structure as an integral part of the carburetor in the form of deeply pocketed areas of metal surrounding hollowed, thin-walled parts.

These and other modifications may be made in the structure illustrated without departing from the spirit of the invention, and the exclusive use of all such modifications has come within the scope of the appended claims as contemplated.

I claim:

1. A heat-resisting spacer device comprising a body portion comprising a plurality of individual short conduits, said conduits being joined together by structure projecting therefrom of substantially thinner construction than said body portion, and restricted axial projections on said structure for engagement with associated structure, the spaces between said body portion and said projections opening outwardly to permit circulation of air therein.

2. A device as specified in claim 1 in which said body part comprises relatively thin-walled construction extending substantially normal to the general plane of the device, said projecting structure comprising a relatively thin web substantially paralleling said general plane.

3. A heat-resisting spacer device for insertion between portions of a conduit and comprising a body part having an aperture for registry with the interior of the conduit, structure projecting laterally from said part, and bracing elements projecting from said structure in directions substantially parallel to the axis of the device for directly engaging the associated structure, the device being of substantial depth so as to form effective insulation and there being substantial space between the adjacent bracing elements at the outer edge of said projecting structure.

4. A device as specified in claim 3, in which said projecting structure is substantially thinner axially of the device than said body part, at least one of said bracing elements serving to reinforce said projecting structure between the inner and outer edges thereof.

5. Heat-resisting spacer structure for insertion between portions of a conduit and comprising a metallic, collar-like, one-piece member of skeletal construction to provide pockets within the general contour of the conduit, and non-metallic gaskets for insertion between each face of said member and the associated portion of the conduit.

6. Structure as specified in claim 5, in which said collar-like member includes an apertured boss for registry with an aperture in the associated conduit, said boss being connected with adjacent parts of said member by relatively thin means spaced substantially from said gaskets.

7. In a carburetor, a body part including a fuel chamber and a plurality of conduits, an adjacent part having conduits forming continuations of the conduits in said body part, and spacer structure between said parts and including a collar-like device of skeletal construction and non-metallic gaskets between opposite faces of said device and the adjacent carburetor parts, said spacer structure comprising a single, transverse, thin web and apertured bosses projecting therefrom and registering with said conduits.

8. Structure as specified in claim 7, in which said skeletal device includes a reinforcing projecting element at an edge thereof for directly abutting said gaskets and means connecting said element with adjacent parts of the device and substantially spaced from said gaskets to provide air pockets.

9. In fuel intake passage structure for an internal combustion engine, a carburetor part including a mixture conduit and a liquid fuel chamber, and an adjacent part forming a passage in continuation of said conduit, a one piece heat resisting device of skeletal construction throughout inserted between said carburetor parts and forming substantial outwardly opening air pockets within the general contour of the passage structure, and gasket means interposed between said heat resisting device and at least one of said carburetor parts.

10. In combination, a carburetor body part having a fuel chamber and a plurality of fluid conduits, an adjacent part having conduits forming continuations of the conduits in said body part, and a spacer device between said parts of unitary, die cast, skeletal construction forming substantial air pockets for resisting the transfer of heat between said parts and having apertures in registry with said conduits, said carburetor parts and said device also having registering holes for attaching bolts.

ERNST H. NIEMAN.